3,460,523
CATALYTIC OVEN COATING COMPOSITIONS
Alvin B. Stiles and Paul Clifford Yates, Wilmington, Del., assignors to E. I. du Pont de Nemours and Company, Wilmington, Del., a corporation of Delaware
No Drawing. Filed Aug. 28, 1967, Ser. No. 663,522
Int. Cl. A21b 1/00
U.S. Cl. 126—19                    9 Claims

ABSTRACT OF THE DISCLOSURE

A composition is provided which is useful for coating the walls of an oven, or the like, to provide a porous film containing catalytic materials. The composition contains finely divided thermally stable oxidation catalyst particles bonded together and to the oven walls by a water soluble alkaline silicate. The composition can optionally contain a filler material.

Background of the invention

U.S. Patent 3,266,477 discloses the use of oxidation catalysts in cooking devices to remove food and other cooking residues by catalytic oxidation. According to that patent, the use of the catalysts permits the cleaning of cooking devices at low oxidation temperatures, thus the cooking devices can be self-cleaning at temperatures of 400 to 500° F.

Problems have been encountered in the art in bonding the catalytic materials to the oven walls to obtain the desired strength, hardness, abrasion resistance and toughness of the coating without an adverse effect on the activity of the catalyst.

Brief summary of the invention

This invention relates to compositions for coating the surfaces of such cooking devices and to the resulting coated surfaces. The compositions of the invention provide improved bonding and catalytic activity.

The coated surfaces consist of a supported porous film having a porosity greater than 15% by volume, and containing as an essential ingredient at least 10% by weight of a thermally stable oxidation catalyst. The oxidation catalyst will be from the oxygen-containing compounds of zirconium, titanium, vanadium, chromium, manganese, cobalt, iron, nickel, tungsten, molybdenum, copper, zinc, and the rare earths and the precious elements rhenium, ruthenium, osmium, iridium, and platinum, and their mixtures.

These oxidation catalysts should have a specific surface area of at least 0.1 square meter per gram and they are bonded continuously to the support and to one another by the interconnected bond of at least 5% by weight of the film exclusive of the support, of an alkali metal silicate. The alkali metal silicate can be an ionic alkali silicate such as sodium, lithium, potassium, or the silicates of strong organic bases which have basic dissociation constants greater than $10^{-3}$, which includes the silicates of guanidine, tetramethylammonium, and tetraethanolammonium cations, or mixtures of these silicates.

Optionally, the porous film can contain a filler material. The filler material can be thermally stable, oxygen-containing compounds of the elements lithium, sodium, potassium, magnesium, calcium, barium, aluminum, titanium, zirconium, zinc, boron, phosphorus, and silicon, with the proviso that the alkali metal and phosphorus compounds contain at least one other element of the group.

Detailed description of the invention

The coated surfaces of this invention consist of supported, porous films having a minimum porosity of at least 15% by volume, based on the volume of the film exclusive of the support. Even more highly porous films are desirable. The preferred degree of porosity will exceed 20% by volume, and, in general, the more porous the film the better, so long as it is sufficiently well bonded to preserve its mechanical integrity and exhibit appreciable resistance to abrasion.

The porous films of the invention are bonded to a reinforcing member which functions as the support for the porous film, giving enhanced rigidity, mechanical strength and shape. The support can cover one major face of the porous film of the body, but at least one major face must be available and have free access to its surroundings. A preferred type of support is one in which the major portion of the porous film has both of its faces available for free contact with its environment. Such films, for example, can be prepared by casting the compositions of the invention onto relatively rigid steel mesh screens or onto plates which are perforated with a multiplicity of holes. Films which are open on only one of the major faces may be prepared by casting the compositions of the invention onto the surface of flat continuous plates.

The material of the support can be any strong, rigid material including metals, ceramics, refractory glasses, polycrystalline glaze compositions such as porcelains, "Pyroceram," and the like, or a combination of more than one of these. It is only necessary that the support can be formed into a convenient shape, that it possess appreciable strength and rigidity, and that it have sufficient thermal stability that it does not soften, melt or otherwise decompose at temperatures up to 600° F. or somewhat higher.

The most preferred supports are those of structural metals such as steel, aluminum, copper, bronze, and various alloys of these, as well as enamel coated supporting elements of the same metals. A particularly preferred support is a mild steel panel which has been coated with a fused vitreous enamel coating of the type which is conventionally employed in preparing panels from which ovens and other kitchen devices are constructed.

The support will normally be in the form of flat plates of the order of ⅛" thick or less, although special forms such as honeycomb structures or various types of convoluted structures are within the scope of the invention.

It should be noted that whenever the word "support" is used in this specification it refers to the backup member or the substrate upon which the film of the invention will be deposited. The word "carrier" when used refers to a high surface area inert particulate material on which the catalytically active ingredient is deposited.

An essential ingredient of the compositions of this invention is catalytically active, very finely divided materials which facilitate the oxidation of organic compounds such as oils, proteins, fats, and similar materials. These catalytically active compounds can be selected from the oxygen-containing compounds of zirconium, titanium, vanadium, chromium, manganese, cobalt, iron, nickel, molybdenum, copper, zinc, and the rare earths, and the precious elements rhodium, palladium, ruthenium, osmium, iridium, and platinum, and their mixtures. Such materials have long been known in the art, used either alone or in conjunction with one another, either in the form of fluidized beds, or in the form of pellets, and have been used for a variety of oxidation reactions. Thus, platinum supported on alumina is a known oxidation catalyst, as are the various oxides and oxide mixtures such as manganese dioxide, cobalt oxide, the manganates or manganites of iron, nickel, tungsten, copper, and zinc, etc.

The most preferred catalysts are compounds of manganese, cobalt, iron, nickel, chromium, tungsten and molybdenum and their mixtures with one another. Particularly preferred are those compositions wherein one or more of the above elements are present in more than one valance state, or may achieve more than one valence state for at least a transient period in the course of an oxidation reaction.

The precious metals in a very finely divided form and preferably dispersed upon the surface of a less finely divided carrier material of some refractory, relatively inert oxide are also well known as catalytic materials facilitating oxidation. Such compositions normally are not used in the form of oxides, but instead the precious metals are employed in their elemental state. Mixtures of the various precious metals with one another, mixtures of these with the various types of transition metal oxide compounds noted above, and mixtures of both of these types of compositions with other materials which are traditionally employed as effective oxidation catalysts in various types of organic chemical reactions are also preferred embodiments as essential ingredients to the compositions of this invention.

It is a necessary feature for the compositions of this invention that such catalysts have a specific surface area of at least 0.1 m.$^2$/g. of catalyst.

As set forth above, an active oxidation catalyst having a surface area in excess of 0.1 m$^2$/g. must comprise at least 10% by weight of the total weight of the porous films of the compositions of this invention excluding, of course, in such a calculation the weight of the support. Preferably, even more catalyst should be included in the manufactured bodies of this invention, and 35% by weight is preferred, with amounts even of 50% by weight being the most highly preferred. Generally, if efforts are made to increase the catalyst concentration substantially higher than 50%, say, for example, in excess of 70% by weight, it is found that the rigidity, abrasion resistance, adhesion and other mechanical properties of the supported porous films of this invention are adversely affected and it is for this reason that it is not normally found desirable to have more than 90% catalyst. The preferred catalyst concentration will thus generally range between 35% and 90% with the most preferred ranging from perhaps 40% to 80% catalyst. The most highly preferred catalysts are those which contain a major portion of an oxygen-containing refractory compound of manganese in the catalyst portion of the composition.

It should be noted that when reference is made to the "catalyst," this includes, as is traditional in the catalyst art, both pure catalysts wherein the body of the catalyst particle and its surface is chemically the same, and supported catalysts, such as the precious metal catalysts discussed above, in which the catalytically active material is distributed uniformly over the surface of a high surface area inert carrier. In subsequent discussion and in the claims of this case, the generic term "catalyst" will be used to encompass both of these variants, which, at least for catalytic purposes, are essentially the same. Since catalytic reactions occur primarily at surfaces, it is of relatively little moment whether the interior is composed of the material of the catalyst or of some other material. Thus, when the percentages of catalyst in the film are discussed, it is to be understood that this can refer either to the catalytically active material itself in the event that it is not dispersed on an inert, high surface area carrier, or to the combined weight of a dispersed catalyst which is on a carrier, and the carrier.

For example, the actual concentration of a precious metal like platinum in an oxidation catalyst may be as little as a few tenths or even a few hundredths of one percent. When such small amounts of platinum are used effectively as catalysts, however, they must be uniformly deposited as an exceedingly thin film on a high surface area carrier such as alumina. For the purposes of discussing the compositions of this invention, such a support catalyst will be referred to simply as the catalyst. The same term will also be used to designate an unsupported catalyst, wherein the catalytically active material is used as its own carrier.

For example, manganese dioxide is relatively inexpensive and therefore can be economically used without precipitating it on the surface of the carrier. The precious metals, on the other hand, cannot economically be employed in a pure form and are therefore invariably used deposited on the surface of a high surface area carrier.

As noted above, it is essential that the catalysts of this invention have a specific surface area of at least 0.1 m.$^2$/g., and it is preferred that they have surface areas substantially greater than this. In general, catalytic activity increases in a directly proportional manner with surface area, and it is for this reason that the preferred compositions will have catalyst surface areas which exceed 5.0 m.$^2$/g., and in the most highly preferred cases will even exceed 10.0 m.$^2$/g.

It has been found that the catalytic activity of the compositions of this invention are related, for any specific catalyst, to the surface area of the catalyst, to the thickness of the supported film, and to the concentration of catalyst present in the film. The most preferred compositions are therefore those which maximize the film thickness, the concentration of catalyst present in the film, and the surface area of the catalyst, while maintaining good properties in regard to mechanical abrasion resistance, water resistance, porosity, and mechanical strength and hardness. Thus the product of catalyst surface area, catalyst concentration and the bed thickness of the porous film should be as high as possible.

Specific illustrations of the various types of catalysts which can be employed and of the relationship of these variables to catalyst activity will be included in the examples.

A second essential ingredient of the compositions of this invention is an alkaline silicate binder selected from the group of lithium, sodium, and potassium silicates and their mixtures or the silicates of strong organic bases, such as guanidine, tetramethylammonium hydroxide and tetraethanolammonium hydroxide and their mixtures. The use of alkaline silicates as binders for a variety of purposes is, of course, quite old in the art and has included such applications as the preparation of inorganic paints, the preparation of adhesive compositions for use at relatively high temperatures, the bonding of roofing granules into hard impervious masses, etc.

Generally speaking, however, it has not been common in the art to use relatively large quantities of alkali metal silicates as binding agents for catalyst materials, because it has been believed that large quantities of alkali metal cations coupled with the relatively low melting and softening points of these materials would deleteriously affect the activity and the life of the catalyst.

It further has been believed in the catalyst art that a molecularly dispersed binder system such as those represented by the alkali metal silicates would adversely affect catalytic activity by coating and covering the active surfaces of the catalyst with a non-catalytically active alkali silicate film. For these reasons, in those instances when alkali metal silicates have been employed to bind catalysts, usually in the form of pellets, it has also been customary to acidify the silicate bond and convert it into a porous silica gel. In any event, and whether such bonds have been acidified or have been allowed to remain as alkali metal silicates, the concentration of alkali metal silicate in such compositions has been held to as low a value as is consistent with achieving a moderately strong bond. Typical values from the work of the prior art might be one or two percent by weight based on the weight of catalyst, or weight of catalyst plus carrier. Typically also, the prior art has not attempted to prepare such compositions in the form of supported, bonded, continuous films. Instead, in order to maximize the access of the reactants to the surface, they have been cast in the form of pellets, of extruded rods, of irregular granules, and the like.

Surprisingly, we have found that the deleterious effects which have hitherto prevented the use of alkaline silicates in substantial quantities as bonding agents for catalysts have not materialized, at least for the compositions of this invention, in the uses for which they are intended. In fact, it has been found that unusual advantages accrue when alkaline silicates are employed as bonding agents and in substantial quantities.

The alkaline silicate bonding agents of this invention are deposited as bonds in a uniform way at relatively low temperatures, and actually become more porous rather than less porous upon firing and curing. Because the bond is formed initially even upon room temperature drying, it is not necessary to fire at excessively high temperatures in order to effect a cure. In addition to being exceptionally strong, abrasion resistant, and hard, the alkaline silicate bonded compositions of this invention do not have to be heated to temperatures sufficiently high to cause undesirable growth of the catalyst particles.

The alkaline silicates which can be used include lithium, sodium, and potassium silicates, mixtures of these with one another, their mixtures with colloidal amorphous silica, the silicates of strong organic bases, e.g., bases having a basic dissociation constant greater than $10^{-3}$, such as guanidine silicate, tetramethylammonium silicate and tetraethanolammonium silicate and mixtures of these latter silicates with the alkali metal silicates.

In general, it is preferred to use such compositions in their dissolved form, that is, in the form of aqueous solutions. Such solutions have a variety of mole ratios of alkali metal cations to silica and are available commercially in a variety of such ratios and concentrations. In general, the film-forming ability of alkali metal silicates is better the lower the mole ratio of silica to alkali metal cations, whereas the water resistance tends to go in the opposite direction. Typical compositions which are useful for the purposes of this invention include sodium silicates having mole ratios of silica to sodium oxide ranging from about 2 to 4.5, lithium silicates having mole ratios ranging from approximately 2 to as high as 10 or 12, and potassium silicates having mole ratios of silica to potassium oxide of from about 2 to about 5.

Such silicates are normally available in the form of aqueous solutions having concentrations ranging from about 20% $SiO_2$ to as high as 35% $SiO_2$ and this concentration range is generally convenient for the preparation of the compositions of this invention.

As noted above, it is possible to modify the properties of the alkali metal silicates by including more or less of other colloidal, film-forming and binding materials including colloidal amorphous silica, the film-forming clays such as bentonite, hectorite, and the like, or fibrous dispersed minerals such as asbestos. It is also desirable to include dispersions of plate-like materials such as talc, kaolin clay, mica, vermiculite, and the like.

As will be discussed subsequently, a wide variety of inorganic, thermally-stable particulate materials can also be added to improve the film-forming characteristics of the catalyst-alkaline mixtures, to modify the hardness of such compositions, and to improve the water resistance of such compositions.

It is possible also to modify the compositions of this invention by using the alkaline silicates of this invention in conjunction with a portion of the glassy frit bonding agents disclosed in copending application Ser. No. 646,164, filed June 15, 1967.

Also, as noted above, it is possible to use organic strong-base silicates, either alone or with the alkali metal silicates. This is sometimes advantageous, in that it is possible to arrive at silica to alkali metal ratios which are much higher than would have been soluble using the alkali metal silicates alone. Somewhat the same obpective is obtained by mixtures of colloidal amorphous silica with alkali metal silicates, since, due to their very fine particle size, such mixtures tend to react with one another even at relatively low temperatures, and form less water-soluble silicates of higher mole ratios of silica to alkali metal oxides than can be prepared in the form of a homogeneous liquid solution.

Because of their lower cost and satisfactory bonding ability, the most preferred alkaline silicates in the compositions of this invention are sodium and potassium silicates, although lithium silicate is also preferred where water resistance is of paramount importance.

The alkaline silicates must comprise at least 5% by weight of the porous bonded films of the invention, and preferably 10% by weight. In general, the films become harder, stronger and tougher the more silicate is used. This, however, must be balanced against the previously mentioned desirability of having the catalyst concentration as high as possible and of maintaining adequate porosity.

In addition to the alkaline silicate bonding agent and the catalyst, it is often advantageous to include a variety of refractory, substantially water-insoluble fillers to improve the toughness of the film and for other purposes. Such materials will be selected from the thermally stable, oxygen-containing compounds of the elements lithium, sodium, potassium, magnesium, calcium, barium, aluminum, titanium, zinc, boron, phosphorus and silicon, with the proviso that the alkali metal and phosphorus compounds contain at least one other element of the group. Specific examples of such fillers include the aluminosilicate clays, such as kaolin, magnesium silicates such as talc, chrysotile asbestos, hectorite clay and the like. They also include traditional refractory fillers such as zircon, titanium dioxide, zirconium oxide, silica in various forms such as diatomaceous earth, ground amorphous silica glass and silica flour.

A particularly preferred class of fillers are those which enhance the water-insolubility of alkali metal silicates by chemical reactions upon drying and firing at low temperatures. These include zinc oxide, magnesium oxide, calcium oxide, as well as many of the silicates and aluminates of these compounds. Similarly, some of the thermally stable, water-insoluble alkaline earth phosphates, borates and the like can advantageously be employed in the compositions of the invention as bulking agents to enhance film hardness, and to partially react with the alkali metal silicate bond to enhance water resistance.

A further class of preferred fillers for the compositions of this invention include a variety of ceramic colored oxides and other pigment materials which are conventionally employed to impart pleasing physical appearances to ceramic bodies. Such ceramic colors, pigments, etc., are well known in the art and may be included in the compositions of this invention to improve the esthetic appearance of the compositions.

In addition to the fillers, alkaline silicates, and catalysts, it is sometimes desirable to include various organic materials to function as temporary plasticizers, as well as detergents and wetting agents to enhance the spreading and wetting characteristics of the compositions of the invention, along with suspending agents which increase thixotropy and viscosity and thus maintain the suspended particulate catalytic constituents and the fillers in a homogeneous state prior to their application. Examples of suitable plasticizers include glycerol, ethylene glycol, and a variety of water-soluble, negatively charged polymeric organic materials such as the water-soluble gums, sodium carboxymethyl cellulose, sugars, starches, and the like. Cationic wetting agents and detergents such as the sodium alkyl aryl sulfonates and the alkali metal soaps, and nonionic detergents and wetting agents such as the alkyl-polyoxyethylenes and long chain alkyl substituted sugars, such as sorbitol, mannitol and the like, are suitable wetting agents when employed in small amounts to enhance the wetting and spreading characteristics of the fluid compositions of the invention.

Suspending agents may be selected either from the naturally-occurring high molecular weight polysaccharides such as the alginates, sodium carboxymethyl cellulose, or inorganic suspending agents such as colloidally dispersed asbestos, and colloidally dispersed bentonite clay. Combinations of inorganic and organic suspending agents may also advantageously be employed. The use of these additives will be further illustrated in the examples of this invention.

The manufactured articles of this invention can be prepared by mixing the essential catalyst ingredients with the essential alkaline silicate ingredients, the catalyst being in the form of a water-insoluble, finely divided, particulate material having a surface area in excess of 0.1 m.$^2$/g., and the alkaline silicate being in the form of a liquid solution. To this may be added the fillers, plasticizers, suspending agents, detergents and other constituents if desired. This fluid composition can then be applied in any convenient manner, such as by spraying, dipping, painting or electrostatic spraying, onto the surface of the previously prepared supporting element.

The support which has now been coated with a liquid film of the compositions of the invention can then be dried in any convenient manner and fired at progressively higher temperatures to eliminate the solvents and decompose thermally unstable constituents such as possible organic additives.

It will generally be found advantageous to dry initially at relatively low temperatures, and thus to get rid of the major portion of the water and other solvents contained in the composition prior to firing the composition at higher temperatures. This preliminary drying step can be accomplished at room temperature or at higher temperatures up to and including the boiling point of water. It is not usually preferred to dry higher than the boiling point of water in the initial drying step, because of the possibility of formation of bubbles of water vapor which disturb the appearance of the continuously bonded film. The continuity of the film is also disrupted when such bubbles eventually break.

Following the preliminary drying which results in the elimination of the greater portion of the water, it may be fired at higher temperatures, preferably in a progressive manner. That is, it is desirable to either raise the temperature slowly and continuously, or to subject it to a series of gradually increased temperatures of firing in a sequence of stages.

The final firing temperature will depend in part upon the characteristics of the substrate or supporting element used. For example, if a preferred mild steel member coated with a vitreous enamel is used as the supporting element, it is undesirable to exceed the softening point of the vitreous enamel coating, since this leads to undesirable cracking and other surface imperfections.

One of the primary advantages of the compositions of this invention when compared with glass-bonded frits is that relatively low temperatures suffice to establish hard, abrasion-resistant and strong bonds. For example, appreciable strength, toughness and integrity can even be obtained by firing for extensive periods of time at temperatures as low as 100° C. Similarly, it is possible to obtain very strong, tough, hard compositions still retaining a desirable level of porosity by firing at temperatures which are normally employed in ovens used in the preparation of foodstuffs. For example, temperatures of 500 to 600° F. are frequently encountered in ovens during normal service, and such temperatures suffice for the application of the compositions of this invention. It is for this reason that the compositions of this invention may be applied to existing ovens by the housewife, and it is unnecessary, as would be the case with the glass frits, for her to have to purchase a new oven or send it to a manufacturer to be especially coated.

Generally speaking, the water resistance of the compositions of this invention increases as the firing temperature is raised, but it is seldom necessary to exceed a firing temperature of 1000° F., even to obtain high levels of water and abrasion resistance in the resulting film. Water resistance can be enhanced, even at relatively low temperatures of firing by the inclusion of reactive ingredients such as those previously mentioned, including zinc oxide, chrysotile asbestos, magnesium oxide, and the like. Such materials react with the silicate bonding agents of the invention to form a multiplicity of silica bonds with the alkaline earth cations or zinc, and such bonds are quite water-insoluble.

Alternatively, it is possible to achieve substantially total water resistance by dipping the compositons of this invention, after drying, into a dilute solution of an acid which converts the alkali metal silicate into a rigid network of silica gel which is extremely water-insoluble.

The time of firing and drying will depend, of course, somewhat upon the temperatures and temperature cycles employed, but in general it will be found that the higher the firing temperature, the lower is the time required. For example, it was noted above that it was possible to achieve well-bonded films by sufficiently long firing, even at 100° C. When such relatively low firing temperatures are employed, and particularly if it is desired to achieve a high level of water resistance, it is desirable to have firing times of the order of a number of hours, and even in some cases cycles of 10 to 20 hours will be found advantageous. As firing temperatures go higher, for example at 500 to 600° F., firing times of the order of an hour or even less are adequate, and firing times of even a relatively few minutes are adequate at temperatures in the order of about 1300° F.

It will be noted again that this represents an advantage in a practical sense when compared with frit-bonded materials fired for relatively extended periods of time in order to give time for the relatively massive frit particles to flow together and coalesce to form a bond. Since the bond in the compositions of this invention is pre-established upon drying, further firing simply has the function of eliminating water and other liquid constituents, accompanied by the previously noted reactions to insolubilize the film.

The finished products of this invention are useful in preparing walls, ceilings, floors, and other interior portions of ovens which are to be employed in the production of food or which otherwise might be subject to soiling with organic materials. They are sufficiently catalytically active to facilitate the oxidation of such soils at relatively low temperatures, including those normally encountered in food preparation. Other uses of the compositions of the invention include the preparation of burners, of exhaust manifolds and tail pipes for internal combustion engines, having products which must be catalytically cleaned to minimize air pollution. They may also be employed as coatings for the inside of exhaust stacks to achieve cleanup and oxidation of undesirable hydrocarbon and other air pollutants.

The following examples will further illustrate the products, processes and uses of this invention.

Example 1

A catalyst composition is prepared by precipitation of 10.33% manganese, 1.21% cobalt, and 0.72% nickel by weight on the final weight of the catalyst composition, in the form of their hydrous carbonates onto a previously prepared carrier of rare earth oxides having the following approximate composition: 47.4% cerium oxide, 25.4% lanthanum oxide, 13.9% neodymium oxide, 5.6% praseodymium oxide, 6.4% samarium oxide, 2% yttrium oxide, and 1.7% gadolinium oxide (such mixtures hereinafter to be referred to in future examples as mixed rare earth oxides) by mixing the corresponding percentages of manganese, cobalt and nickel salts in the form of their nitrates and precipitating these upon the surface of the rare earth oxides by addition of ammonium bicarbonate.

The resulting composition is washed, dried and calcined at 400° C. to furnish a composition having the previously noted concentrations of metals in the form of their oxides with the mixed rare earth oxides. The surface area of this catalyst is 48 m.²/g.

This represents an example of one of the supported catalysts of the invention, in that while the mixed rare earth oxides are, in fact, oxidation catalysts, they are less active than are the oxides of manganese, cobalt and nickel.

The sequence of pH increases employed in the neutralization of the metal nitrates is such that the rare earth oxides and hydrous oxides are first precipitated in the above preparation with the manganese, cobalt and nickel hydroxycarbonates subsequently coating the precipitated rare earth hydroxycarbonates.

Ten grams of the calcined dry catalyst are then mixed by stirring with 30 grams of a mixture containing 64.5/ amorphous silica of graded sizes ranging from 5 microns to 150 mesh particles, the size gradation being such as to enhance the packing ability of the amorphous silica ground filler, and containing 12.4% of an ionic sodium silicate solution having a molar ratio of $SiO_2$ to $Na_2O$ of approximately 3.3, along with 15 grams of water to make a fluid paste.

After stirring, this paste is painted onto the surface of a 4" x 4" mild steel panel which has a coating on both sides of a vitrified enamel of the type conventionally used in coating the interior walls of ovens.

This material is air dried overnight, half of the film is then treated with dilute acetic acid, to convert the alkali metal silicates at least on their surface into silica gel. This plate is then fired for an hour at 600° F. The resulting film is exceedingly tough.

A very heavy oil stain composed of equal parts by weight of safflower oil, peanut oil, and a totally hydrogenated saturated oil is placed upon the plate and it is found to be totally catalytically oxidized after only 15 minutes of heating at a temperature of 600° F.

It is noted that although the acid treated half of the film has better water resistance than that half which has not been treated with acid, the catalytic oxidation of the oil is somewhat slower.

The rigid, porous, catalytically active formed article contained 11.21% of the sodium silicate binder, 30.5% of the active catalyst, with the remainder being the refractory silica filler. This plate is very hard, corrosion and erosion resistant, and shows good water resistance even on the side which has not been acidified to enhance the water resistance. The porosity of this film is approximately 50% by volume, exclusive of the volume of the enameled steel substrate.

Example 2

Ten grams of the catalyst of Example 1 is mixed with 20 grams of the sodium silicate-silica composition of Example 1, and 10 grams of a solution of sodium silicate and water having a mole ratio of silica to sodium oxide of 3.3 and a concentration of 32.7% solids. A film is cast as described in Example 1. The resulting film contains 33.7 weight percent catalyst, 20 weight percent sodium silicate, with the remainder of the composition being the amorphous silica filler. Two plates are prepared from this mixture. One is fired at 700° F. while the other is fired to 1400° F. Both plates are stained heavily with oil and both completely catalytically oxidized the oil in less than 30 minutes at a temperature of 600° F.

As an illustration of the toughness, adherence, hardness, and water resistance of this film, the plate which had been fired to 1400° F. is first soaked in 10% acetic acid for an hour, then soiled repeatedly with oil, with sugar, with milk, and these are catalytically oxidized off in sequential treatments, there being more than 15 such treatments. In between each treatment the plate is scrubbed vigorously with steel wool and detergent under constantly running water, and finally the plate is boiled 14 hours in a 5% caustic solution. The plate is virtually unchanged by all of these drastic procedures, and is still catalytically active, as shown by the fact that it can oxidize a uniformly sprayed film of oil on its surface completely, leaving no residue of oil, in less than an hour at a temperature of 450° F.

Example 3

Twenty grams of the catalyst of Example 1, and 20 grams of the sodium silicate-silica filler composition of Example 1 are mixed with 10 grams of a solution of ionic guanidine silicate containing 20% $SiO_2$ and an equal mole ratio of guanidinium ions to silica. This composition is applied to a panel as noted in Example 1 and dried on a steam bath. It is subsequently fired for one hour at 550° F. The dried coated panel is then stained with oil and it is found to be very catalytically active, in that 79% of a heavy oil stain is catalytically oxidized in one hour at a temperature of 550° F. The final composition contains 34.3% catalyst, 12.65% sodium silicate, having a mole ratio of silica to sodium oxide of about 4.6. The higher mole ratio in the end composition of the invention results from the decomposition of the guanidine cation and the combination of the silica with which it was originally associated with the silica in the sodium silicate. The remainder of the composition is the amorphous silica filler. The film porosity is in excess of 40% by volume.

Example 4

Ten grams of a calcined sample of maganese carbonate which has the aproximate formula $Mn_2O_3$, and which has a surface area of 119 square meters per gram, is mixed with 30 grams of the sodium silicate-silica filler mixture of Example 1 and 10 grams of the sodium silicate aqueous solution described in Example 2 and a film is cast as described in Example 1. This forms an exceedingly hard, porous and tough film which is water-insensitive and is highly catalytically active. The film is stained repeatedly in the same area of the plate with four successive stainings of oil, each of which burns out in approximately an hour at a temperature of 520° F. The porosity of this film is in excess of 50% by volume.

Example 5

Thirty grams of the sodium silicate-silica filler of Example 1, and 10 grams of the aqueous sodium silicate solution of Example 2 are mixed with 10 grams of the catalyst of Example 1 and with 4 grams of glycerine, and the resulting plate is dried on a steam bath at 90° C. for 20 minutes, heated for 20 minutes at a temperature of 125° C., heated for a period of 20 minutes at 315° C., and finally heated for 20 minutes at a temperature of 650° C. The resulting, hard, smooth, tough, water-resistant film has excellent abrasion resistance and is highly catalytically active in getting rid of soil coming from various kitchen stains in a period of only a few minutes at temperatures as low as 450° F. The glycerine additive in the above composition facilitates rapid curing with a minimum tendency toward cracking or crazing of the resulting film. The final film contains 33.7 weight percent catalyst, 20 weight percent sodium silicate, with the remainder of the mixture being amorphous ground silica flour.

Example 6

Ten grams of the catalyst of Example 1, 3 grams of a very finely divided talc, 16 grams of the sodium silicate-silica mixture of Example 1, and 15 grams of the sodium silicate solution of Example 2, are mixed with 2 grams of glycerine and 4 grams of water, spread on a 4" x 4" enameled steel plate, and cured as described in the previous example. This plate is very hard, tough, water-resistant and abrasion resistant. It is also highly catalytically active, burning up heavy oil stains completely in periods of less than an hour at a temperature of 450° F. This is an example of the use of a reactive filler such as the hydrated magnesium silicate, talc, to enhance the water resistance of the film.

The catalyst concentration in this composition is 33% by weight, the sodium silicate concentration is 22.7%, the concentration of talc is 10% by weight, with the amorphous ground silica filler making up the balance of the composition.

Example 7

A panel is prepared in which case all ingredients are the same as those of the Example 4, with the exception that 10 grams of an 80 square meter per gram cobalt oxide powder is substituted for the manganese dioxide powder of the Example 4. The resulting plate has the same chemical composition in terms of relative percentages of talc, sodium silicate, silica filler, and catalyst, with the exception that the catalyst in this instance is, of course, cobalt oxide. This is an excellent plate, showing high catalytic activity coupled with excellent film-forming properties.

Example 8

A plate was prepared which is identical with that of Example 7, with the exception that nickel oxide having a surface area of 110 square meters per gram is substituted for cobalt oxide, and the results obtained are substantially identical with the exception that the nickel oxide does not appear to be quite as active catalytically. It is necessary to raise the temperature of the oven to approximately 520° F. to burn off food stains, whereas in the case of the manganese oxide and the cobalt oxide plates, it is possible to do this at a temperature of only 450° F.

Example 9

A composition is prepared employing the sodium silicate aqueous solution of Example 2, to which is added 2.5 weight percent of a finely divided, pure form of chrysotile asbestos, having a surface area of 60 square meters per gram, the relative proportions of asbestos and sodium silicate being adjusted such that when this mixture is employed in equal portions with a 100 square meter per gram sample of manganese dioxide, the resulting film is 50% by weight of catalyst and 50% by weight of the combined sodium silicate-chrysotile asbestos mixture. This is applied by spraying on a plate and forms a thin, hard, black film which is totally water-resistant after firing at 500° F. This plate shows exceptionally high catalytic activity. The excellent water resistance of this composition can be attributed to the use of the reactive magnesium silicate filler in the form of the chrysotile asbestos dispersion.

Example 10

A composition is prepared which is identical with that prepared in Example 1 except that the silica filler is replaced by a similar sized fraction of a ground enamel frit composed of a vitrified glass containing sodium oxide, potassium oxide, boric oxide, zirconia, silica, magnesium oxide and calcium oxide. This glassy frit has a softening point of 1100° F. After processing as in Example 5, the final panel is a porous, hard, thin film containing 11.21% sodium silicate binder, 30.5% catalyst (the catalyst of Example 1) and 58.3% of the glassy frit. This is an excellent catalyst panel in the oxidation of oil, milk stains, sugar spills and meat gravy.

The panel is also exceptionally water- and abrasion-resistant.

Example 11

A panel is prepared by the procedure of Example 2 and using similar quantities of the same ingredients, except that potassium silicate solution containing 20% $SiO_2$ and having a molar ratio of $SiO_2$ to $K_2O$ of 3.86 is substituted in equivalent quantities wherever sodium silicate of 3.3 mole ratio was employed in Example 2. The results obtained are substantially identical with those of Example 2.

The same procedure, ingredients and amounts of materials are also used to prepare panels, except that a 4.5 mole ratio solution of $SiO_2/Li_2O$ lithium silicate binder having 22% $SiO_2$ was substituted for the sodium silicate of Example 2. This panel is also substantially identical with those of Example 2, except that it has even better water resistance, particularly after low temperature firing.

Example 12

Panels are prepared using the ingredients, amounts, and procedure of Example 6, except that a 25% $SiO_2$ 1./1. mole ratio solution of guanadine silicate is substituted for sodium silicate and finely divided MgO is substituted for the talc of Example 6. The resulting panels after firing show excellent catalytic activity, and exceptional water resistance.

Example 13

The procedures, amounts, and types of ingredients of Example 5 are repeated except that instead of the catalyst of Example 1, a 200 m.²/g. 1% platinum catalyst deposited on an alpha alumina carrier is substituted. The plates obtained are physically similar to those of Example 5 and are catalytically active in burning off oil and sugar residues from the plate at 600° F. when the plate is used in the interior of a conventional electric cooking oven.

We claim:

1. In a composition for applying to the surfaces of cooking devices exposed to cooking residues, the composition containing at least 10% by weight of a finely divided, thermally stable oxidation catalyst, the improvement comprising incorporating in said composition at least 5% by weight on the dry basis, of an alkaline silicate selected from the group consisting of sodium silicate, lithium silicate, potassium silicate, the slicates of organic bases havng a basic dissociation constant greater than $10^{-3}$ and mixtures thereof.

2. The composition of claim 1 wherein said oxidation catalyst has a specific surface area of at least 0.1 square meters per gram and is selected from the group consisting of the oxygen containing compounds of zirconium, titanium, vanadium, chromium, maganese cobalt, iron, nickel, tungsten, molybdenum, copper, zinc, and the rare earths; elemental palladium, rhodium, ruthenium, osimium, iridium and platinum; and mixtures thereof.

3. The composition of claim 1 containing in addition a substantially water-insoluble refractory filler selected from the group consisting of the oxygen containing compounds of lithium, sodium, potassium, magnesium, calcium, barium, aluminum, titanium, zirconium, zinc, boron, phosphorus, silicon and mixtures thereof, with the proviso that the alkali metal and phosphorus compounds contain at least one other member of the group.

4. In a composition for applying to the surface of cooking devices exposed to cooking residues, the composition containing at least 10% by weight of an oxygen containing compound of manganese having a specific surface area of at least 0.1 square meter per gram, the improvement comprising incorporating into said composition at least 5% by weight on the dry basis of sodium silicate.

5. The composition of claim 4 containing in addition silica as a filler.

6. A surface capable of catalyzing an oxidation reaction comprising a support and bonded to said support a porous film having a porosity greater than 15% by volume, said film comprising at least 10% by weight of a thermally stable oxidation catalyst having a surface area in excess of 0.1 square meter per gram and selected from the group consisting of the oxygen containing compounds of zirconium, titanium, vanadium, chromium, manganese, cobalt, iron, nickel, tungsten, molybdenum, copper, zinc, and the rare earths; elemental palladium, rhodium, ruthenium, osmium, iridium, and platinum; and mixtures thereof; and at least 5% by weight of an alkaline silicate selected from the group consisting of sodium silicate, lithium silicate, potassium silicate, the silicates of organic bases having a basic dissociation constant greater than $10^{-3}$ and mxtures thereof.

7. The surface of claim 6 containing in addition a substantially water-insoluble refractory filler selected from the group consisting of the oxygen containing compounds of lithium, sodium, potassium, magnesium, calcium, barium, aluminum, titanium, zirconium, zinc, boron, phosphorus, silicon and mixtures thereof, with the proviso that the alkali metal and phosphorus compounds contain at least one other member of the group.

8. The surface of a cooking device exposed to cooking residues comprising a support and bonded to said support a porous film having a porosity greater than 15% by volume, said film comprising at least 10% by weight of an oxygen containing compound of manganese having a specific surface area of at least 0.1 square meter per gram and at least 5% by weight of alkali metal silicate.

9. The surface of claim 8 containing in addition silica as a filler.

References Cited
UNITED STATES PATENTS 3,266,477   8/1966   Stiles _____ 126—19

FREDERICK L. MATTESON, Jr., Primary Examiner

EDWARD G. FAVORS, Assistant Examiner

U.S. Cl. X.R.

252—454

Disclaimer 3,460,523.—*Alvin B. Stiles* and *Paul Clifford Yates*, Wilmington, Del. CATALYTIC OVEN COATING COMPOSITIONS. Patent dated Aug. 12, 1969. Disclaimer filed Mar. 26, 1973, by the assignee, *E. I. du Pont de Nemours and Company*.

Hereby enters this disclaimer to claims 1, 2 and 3 of said patent.

[*Official Gazette September 4, 1973.*]